US006080080A

United States Patent [19]

Bolz et al.

[11] Patent Number: 6,080,080

[45] Date of Patent: Jun. 27, 2000

[54] DEVICE AND METHOD FOR ADJUSTING THE TRANSMISSION RATIO OF A CVT

[75] Inventors: Martin-Peter Bolz, Oberstenfeld; Joachim Luh, Bietigheim-Bissingen; Holger Hülser, Stuttgart, all of Germany

[73] Assignee: Robert Bosch GmbH, Stuttgart, Germany

[21] Appl. No.: 09/308,997

[22] PCT Filed: Jul. 30, 1998

[86] PCT No.: PCT/DE98/02182

§ 371 Date: Jun. 1, 1999

§ 102(e) Date: Jun. 1, 1999

[87] PCT Pub. No.: WO99/16635

PCT Pub. Date: Apr. 8, 1999

[30] Foreign Application Priority Data

Sep. 30, 1997 [DE] Germany ........................... 197 43 058

[51] Int. Cl.[7] ........................................ F16H 59/42

[52] U.S. Cl. ........................................ 477/39; 477/47

[58] Field of Search .............................. 477/38, 39, 47

[56] References Cited

U.S. PATENT DOCUMENTS

| | | | |
|---|---|---|---|
| 4,641,553 | 2/1987 | Kobayashi | 477/47 |
| 4,700,590 | 10/1987 | Omitsu . | |
| 4,784,021 | 11/1988 | Morimoto | 477/47 |
| 4,803,900 | 2/1989 | Ohkumo . | |
| 5,085,104 | 2/1992 | Kouno . | |
| 5,095,776 | 3/1992 | Sato | 477/39 |
| 5,113,718 | 5/1992 | Sato . | |
| 5,199,399 | 4/1993 | Shibuya . | |
| 5,435,795 | 7/1995 | Mochizuki et al. | 477/39 |

FOREIGN PATENT DOCUMENTS

| | | |
|---|---|---|
| 0274080 | 7/1988 | European Pat. Off. . |
| 0451887 | 10/1991 | European Pat. Off. . |

*Primary Examiner*—Dirk Wright
*Attorney, Agent, or Firm*—Walter Ottesen

[57] ABSTRACT

The invention relates to an adjustment of the transmission ratio of a transmission having a primary end and a secondary end. The transmission is continuously variably adjusted with respect to its transmission ratio and is mounted between a vehicle engine and the drive wheels. According to the invention, means are provided by means of which a deceleration state of the vehicle of a pregivable or pregiven extent is determined. The output rpm of the vehicle engine is adjusted or controlled in dependence upon the detected rpm of the primary end in response to the determination of one such deceleration state. With the invention, it can be ensured that the vehicle with a CVT transmission comes to standstill for a transmission ratio close to the start transmission ratio even for especially intense decelerations at low speeds (30 to 60 km/hour). Furthermore, the engine can be fired with fuel in order to increase the volumetric displacement of the hydraulic pump without the problem that the vehicle engine applies power to the wheels which opposes the braking action.

10 Claims, 2 Drawing Sheets

WKon/off
Nmot
Ns
Np
Vl
MOT
α
I
A
B
C
W
1
2
3
4
5
6
7
8
9
10
11
12
13
14
15
16
17
18
19
20
21
22
23
24
25

DEVICE AND METHOD FOR ADJUSTING THE TRANSMISSION RATIO OF A CVT

FIELD OF THE INVENTION

The invention relates to an arrangement and a method for adjusting the transmission ratio of a continuously variable transmission.

BACKGROUND OF THE INVENTION

Continuously variable vehicle transmissions are generally identified by "CVT" and are, for example, known from EP,A1,0,451,887. Such CVT transmissions permit driving at low engine rpms. The adjustment of the transmission ratio generally takes place hydraulically and the required hydraulic pressure is supplied by a hydraulic pump driven by the vehicle engine. However, a sudden and very intense braking can lead to the situation that the CVT transmission still has a relatively low transmission ratio in some circumstances for a vehicle standstill because the volumetric displacement of the pump at low engine rpms is insufficient in the short braking time which is available in order to adjust the transmission to a high start transmission ratio. If the vehicle is at standstill, then the transmission cannot be adjusted so that the objective must be to always reach the start transmission ratio shortly before the vehicle comes to standstill.

In order to adjust the start transmission ratio at the end of the braking operation, the transmission can be adjusted as rapidly as possible to large transmission ratios when an intense deceleration is recognized. A torque converter is generally mounted between the vehicle engine and the CVT transmission and this torque converter can be bridged by a converter bridging clutch. For this reason, the rpm of the engine drops to the idle rpm at the instant at which the converter bridge clutch opens. At the very latest, it can be that the displacement volume of tine hydraulic pump is no longer adequate in order to adjust the transmission so that the vehicle comes to standstill with transmission ratios which are less than the start transmission ratio.

One possibility of solving this problem comprises driving the engine at an increased idle rpm during braking. However, this can remain only a very limited intervention because, during deceleration of the vehicle, in no case can a propulsion torque be effective on the wheels because of increased engine rpm.

SUMMARY OF THE INVENTION

The object of the present invention is to reliably reach the start transmission ratio at the end of braking without extending the actual braking operation.

As already described, the invention proceeds from a transmission which is mounted between the vehicle engine and the drive wheels of a vehicle and is designed with respect to its transmission ratio so as to be continuously adjustable. This CVT transmission has a primary end and a secondary end. At least first sensor means are provided for detecting the rpm of the primary end.

The essence of the invention is that a deceleration state of the vehicle of a pregiven or pregivable extent is determined. The output rpm of the vehicle engine is adjusted in dependence upon the detected rpm of the primary end in response to the determination of this deceleration state. It is especially provided that additional sensor means for detecting the output rpm of the vehicle engine are provided and the output rpm of the vehicle engine is adjusted in the sense of a control to the detected rpm of the primary end.

The invention proceeds from the condition that during a braking operation by the vehicle engine, such an accelerated torque can be effective which is just so high that no propulsion power is transmitted via the converter which opposes braking. Here, it is provided that a torque converter having a converter bridge clutch is mounted between the vehicle engine and the transmission. The converter bridge clutch is opened in response to the determination of the deceleration state.

A hydrodynamic converter transmits no power precisely when the output rpm and the input rpm are equal, that is, the converter slip is zero. Accordingly, the converter input rpm, that is, the engine output rpm, is so controlled during the deceleration operation (braking operation) that it is equal to the converter output rpm, that is, the transmission input rpm. In this way, the transmitted power is controlled to zero via the converter. Adjusting the transmission to large transmission ratios leads to the situation that the vehicle engine is controlled to an rpm clearly greater than the idle rpm. In this way, it is ensured that the pump displacement power is sufficiently large during the entire braking operation in order to adjust the transmission rapidly to large transmission ratios. Furthermore, this ensures that no positive accelerating forces arrive at the wheels from the vehicle engine.

It is especially provided that the adjustment of the output rpm of the vehicle engine (that is, the converter input rpm) takes place in such a manner that a pregivable or pregiven threshold value is not exceeded. This affords the advantage that the engine rpm is not increased unnecessarily high.

In a further embodiment of the invention, it is provided that the adjustment of the output rpm of the engine, which is dependent upon the detected rpm of the primary end, only takes place when the output rpm of the vehicle engine and/or the rpm of the primary end does not drop below a pregiven or pregivable threshold value. Accordingly, if the transmission input rpm drops to a value which is a specific amount greater than the idle rpm, then the adjustment or control according to the invention is switched off.

It is especially provided that a deceleration quantity is determined which is especially dependent upon the detected wheel rpms. This deceleration quantity represents the longitudinal speed of the vehicle. The deceleration state of the vehicle is then determined when the deceleration quantity, which is so determined, exceeds a pregivable or pregiven threshold value.

It is especially advantageous that the adjustment of the engine rpm is ended when the deceleration state is no longer determined. This adjustment is dependent upon the detected rpm of the primary end. The adjustment or control of the engine rpm in accordance with the invention is interrupted when the vehicle deceleration drops below a specific value.

As already mentioned, the transmission ratio is adjusted to low transmission ratios during the deceleration state.

With the invention, it can be ensured that the vehicle having a CVT transmission can come to standstill with a transmission ratio close to the start transmission ratio even for especially intense decelerations from low speeds (30 to 60 km/hour). Furthermore, the engine can be fired with fuel in order to increase the displacement volume of the hydraulic pump without the concern that the engine delivers power to the wheels which opposes the braking action.

BRIEF DESCRIPTION OF THE DRAWING

FIG. 1 shows an overview diagram of a continuously adjusted transmission whereas

DESCRIPTION OF THE PREFERRED EMBODIMENTS OF THE INVENTION

The invention will be explained in greater detail in the following with respect to the embodiments.

Figure 1:
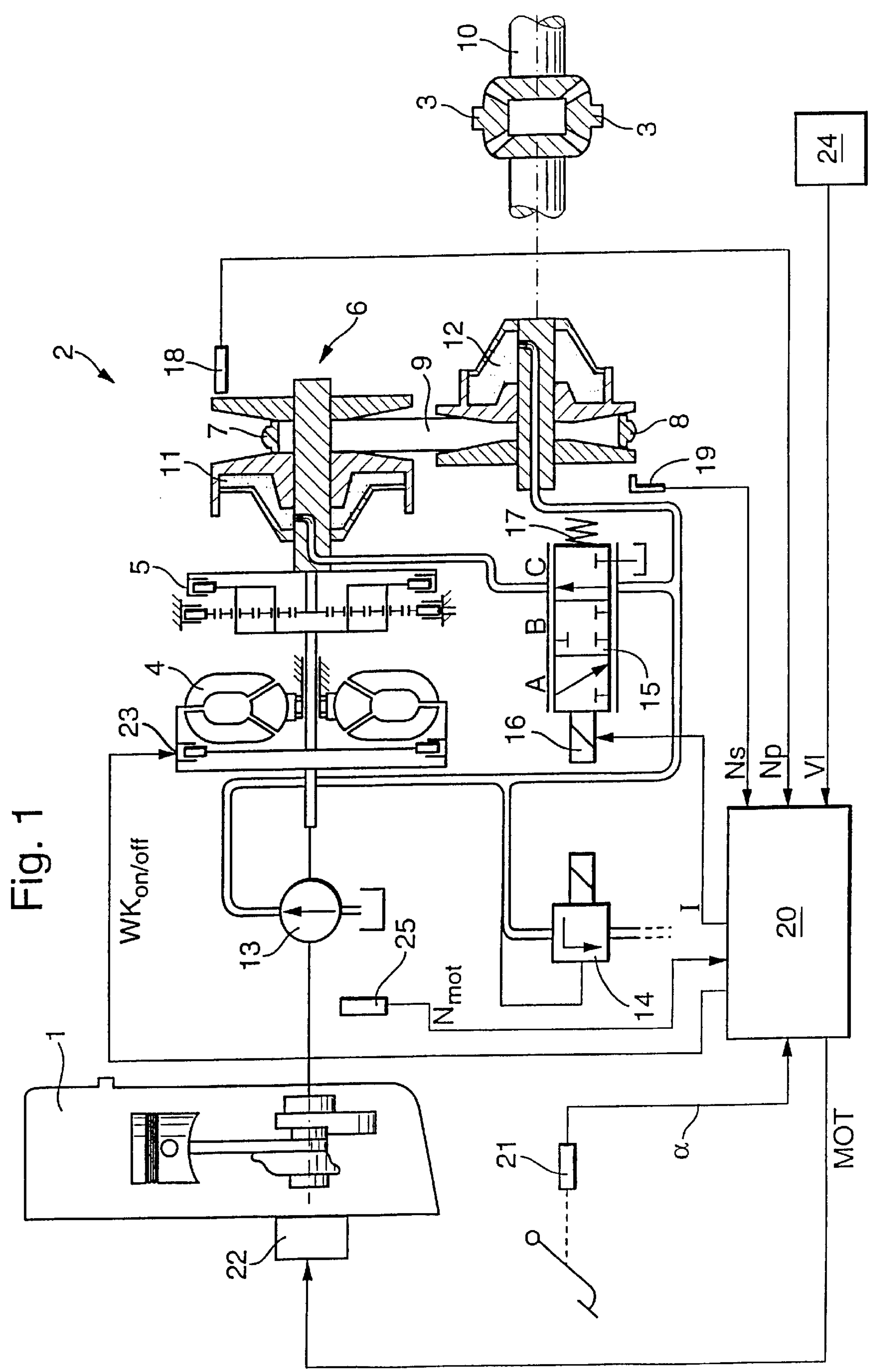

In FIG. 1, reference numeral 2 identifies a continuously variable transmission in a motor vehicle for the purpose of transmitting force from the engine 1 to the drive shafts 3 of the wheels. Such a continuously variable transmission has, for example, a torque converter 4 and clutches 5 for forward and rearward driving switchovers. The clutches 5 are mounted between the engine 1 and the variator 6. The converter 4 can be bridged by the converter bridge clutch 23 up to a slip-free operation. The opening and closing of the converter bridge clutch 23 is shown with the drive of the clutch 23 by the signal $Wk_{on/off}$.

The operational sequences of the vehicle engine 1 are open-loop controlled or closed-loop controlled by the engine control apparatus 22. The output rpm Nmot of the engine 1 corresponds to the input rpm of the converter 4 and is detected by the rpm sensor 25. The vehicle longitudinal speed V1 is determined in block 24, generally in dependence upon the wheel rpm detected by sensors. The signal Mot is transmitted from the unit 20 to the engine control apparatus 22 for adjusting a specific output rpm Nmot.

The variator 6 comprises a drive or primary end conical disc assembly 7 and an output or secondary end conical disc assembly 8. The force is transmitted from the drive end disc assembly 7 to the output disc assembly 8 with the aid of a chain or a thrust belt 9. Each conical disc assembly comprises an axially fixed and an axially movable disc. The transmission ratio of the variator 6 changes from a high start transmission ratio to a low overdrive transmission ratio by simultaneously varying the axially movable discs on the drive disc assembly and the output disc assembly.

The output disc assembly is connected via a compensating gear assembly 10 to the drive shafts 3 of the wheels. The axially movable cone disc units 7 and 8 are hydraulically adjustable and have oil chambers 11 and 12 for this purpose.

The transmission has an oil pump 13 for providing a pressurized oil fill supply. In general, the oil pump 13 runs at the rpm of the internal combustion engine 1. In one possible embodiment, the tension of the belt 9 is adjusted with the aid of a pressure limiting valve 14 which regulates the pressure in the output-end oil chamber 12. The transmission ratio is adjusted with the aid of a proportional valve (primary valve) 15 at the primary end.

This primary valve 15 can release oil from the drive end oil chamber 11 in position A and, in this way, reduce the pressure whereby the transmission ratio is adjusted toward low. In the position C, the oil flows into the drive-end oil chamber 11 whereby the transmission ratio is changed in the direction of overdrive and the pressure in the drive-end oil chamber 11 increases. In the position B of the proportional valve 15, the oil chamber 11 is sealed off, that is, virtually no oil can flow into or out of the oil chamber 11. The proportional valve 15 can, for example, be directly controlled or can be controlled via a precontrol valve in a manner known per se.

In the embodiment described here, a force is generated on the valve slide by adjusting a current I in the magnet 16. A specific position of the proportional valve 15 adjusts via the spring 17 provided on the valve slide. This means that the current I determines the position of the proportional valve 15 via the magnets 16 and therefore the opening cross section of the valve.

Furthermore, a sensor 18 is provided for determining the primary rpm Np and a sensor 19 for determining the secondary rpm Ns. The primary and secondary sensor signals Np and Ns are supplied to a control apparatus 20 which adjusts the current I through the magnet 16 of the proportional valve 15. Furthermore, a sensor 21, for example, for determining the position $\alpha$ of the accelerator pedal actuated by the driver is connected to the control apparatus 20.

Figure 2:
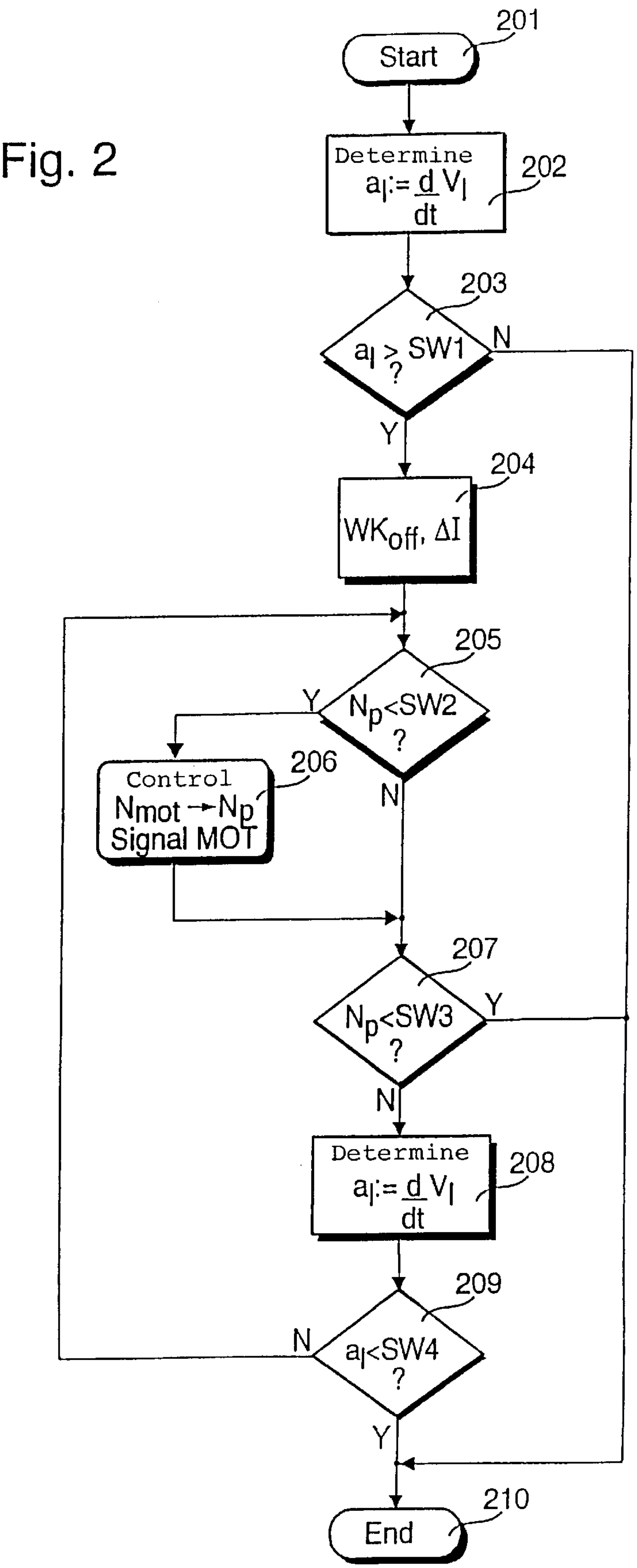
FIG. 2 shows a sequence diagram.

FIG. 2 shows a sequence of the invention in accordance with the embodiment. After start step 201, the vehicle longitudinal acceleration a1 is determined in step 202 as a time-dependent derivative of the vehicle longitudinal speed from the vehicle longitudinal speed V1. In general, the vehicle longitudinal speed is determined in block 24 of FIG. 1 in dependence upon the wheel rpms.

In block 203, the longitudinal acceleration, which is so determined, is compared to a first threshold value SW1 which can, for example, amount to 3.5 m/sec$^2$. If the vehicle longitudinal acceleration drops below the threshold value SW1, then the program moves directly to the last step 210 because, in this case, there is no sufficiently large deceleration of the vehicle present. However, if the vehicle longitudinal deceleration exceeds the threshold value SW1, then the converter bridge clutch is opened in step 204 via the signal $Wk_{off}$. At the same time, the transmission ratio is adjusted as rapidly as possible to high transmission ratios via drive $\Delta I$ of valve 15. In step 205, an inquiry is made as to whether the transmission input rpm (the primary rpm Np) is less than a threshold value SW2, for example, 2,500 revolutions per minute. If this is the case, then, in step 206, the engine output rpm Nmot is controlled to the transmission input rpm Np. This takes place either directly from the unit 20 or via a corresponding drive of the engine control 22 by the signal Mot.

However, if it is determined in step 205 that the rpm limit SW2 is exceeded, then the program is moved directly to step 207. Exceeding an upper rpm limit SW2 is avoided by the inquiry 205 in that the engine no longer generates a torque above this limit.

In step 207, the transmission input rpm Np is compared to a third threshold value SW3 which, for example, is 200 rpm greater than the idle rpm of the engine. If the transmission input rpm exceeds the lower rpm threshold value SW3 (inquiry result "no" in block 207), then the transmission input rpm is still sufficiently far from the idle rpm of the engine whereupon, in step 208, the vehicle longitudinal deceleration a1 is again determined.

However, if it is determined in block 207 that the transmission input rpm drops below the lower threshold value SW3, then the program moves directly to end step 210 and the control according to the invention is interrupted.

If the transmission input is, however, still insufficiently far from the idle rpm of the engine then, after the renewed determination of the vehicle longitudinal deceleration in block 208, a check is made in block 209 as to whether the actual vehicle longitudinal deceleration a1 drops below a fourth threshold value SW4 which, for example, can be 2 m/sec$^2$. If the vehicle longitudinal deceleration is still sufficiently great, that is, the braking operation still continues (inquiry result "no" in block 209), then the control according to the invention is maintained with the drive of blocks 205 or 206. The control is interrupted with a transition to the end step 210 when it is noted in block 209 that the actual vehicle longitudinal deceleration drops below the fourth threshold value SW4. In this case, no braking operation of sufficient magnitude is any longer present.

After the last step 210, the sequence shown in FIG. 2 is started again.

In summary, it is noted that the invention relates to an adjustment of the transmission ratio of a transmission having a primary and a secondary end. The transmission is continuously adjustable with respect to its transmission ratio and is mounted between a vehicle engine and the drive wheels. According to the invention, means are provided by means of which a deceleration state of the vehicle of a pregiven or pregivable extent is determined. In response to the determination of such a deceleration state, the output rpm of the vehicle engine is adjusted or controlled in dependence upon the detected rpm at the primary end. With the invention, even for especially intense decelerations at low speeds (30 to 60 km/hour), it is ensured the vehicle having a CVT transmission comes to a standstill for a transmission ratio close to the start transmission ratio. Furthermore, the engine can be fired with fuel in order to increase the volumetric displacement of the hydraulic pump without the problem that the vehicle engine supplies power to the wheels which opposes the braking action.

What is claimed is:

1. An arrangement for adjusting the transmission ratio of a continuously variable transmission of a motor vehicle having an engine and drive wheels, the transmission being mounted between said engine and said drive wheels and having a primary end and a secondary end, the arrangement comprising:

sensor means for detecting the rpm (Np) of said primary end; and, control means for determining a deceleration state of said vehicle of a pregivable or pregiven extent and for adjusting the output rpm (Nmot) of said vehicle engine in response to the determination of said deceleration state and in dependence upon said rpm (Np) of said primary end.

2. The arrangement of claim 1, said sensor means being a first sensor means and said arrangement further comprising:

second sensor means for detecting the output rpm (Nmot) of said vehicle engine; and, means for adjusting said output rpm (Nmot) to provide a control of said output rpm (Nmot) to the detected rpm (Np) of said primary end.

3. The arrangement of claim 1, wherein the adjustment of the output rpm (Nmot) of said vehicle engine takes place in such a manner that a pregivable or pregiven second threshold value (SW2) is not exceeded.

4. The arrangement of claim 1, wherein the adjustment of the output rpm (Nmot) of the vehicle engine can only take place when the output rpm (Nmot) of the vehicle engine and/or the rpm (Np) of the primary end does not exceed a pregivable or pregiven third threshold value (SW3), the adjustment of the output rpm (Nmot) being dependent upon the detected rpm (Np) of the primary end.

5. The arrangement of claim 1, wherein a deceleration quantity (a1) representing the vehicle longitudinal speed is determined especially in dependence upon the detected wheel rpms; and, the deceleration state of the vehicle is determined when the determined deceleration quantity (a1) exceeds a first pregivable or pregiven threshold value (SW1).

6. The arrangement of claim 1, wherein the adjustment of the output rpm (Nmot) of the vehicle engine is then ended when the deceleration state is no longer determined, the adjustment of the output rpm (Nmot) being dependent upon the detected rpm (Np) of the primary end.

7. The arrangement of claim 1, wherein the transmission ratio is shifted to lower transmission ratios in response to the determination of the deceleration state.

8. The arrangement of claim 1, further comprising: a torque converter having a converter bridge clutch; said torque converter being arranged between the vehicle engine and the transmission; and, said control means being so configured that the converter bridge clutch is opened in response to the determination of the deceleration state.

9. A method for adjusting the transmission ratio of a transmission having a primary end and a secondary end, the transmission being continuously adjustable with respect to its transmission ratio and being mounted between the vehicle engine and the drive wheels, the method comprising the steps of:

detecting at least the rpm (Np) of the primary end;

determining a deceleration state of the vehicle of a pregivable or pregiven extent and adjusting the output rpm (Nmot) of the vehicle engine in dependence upon the detected rpm (Np) of the primary end in response to the determination of the deceleration state; and, detecting the output rpm (Nmot) of the vehicle engine and adjusting the output rpm (Nmot) of the vehicle motor in the sense of a control to the detected rpm (Np) of the primary end.

10. The method of claim 9, wherein a torque converter having a converter bridge clutch is mounted between the vehicle engine and the transmission; and, the converter bridge clutch is opened in response to the determination of the deceleration state.

* * * * *